United States Patent
Dankbaar et al.

(10) Patent No.: US 10,207,619 B2
(45) Date of Patent: Feb. 19, 2019

(54) SMA VALVE FOR CONTROLLING PRESSURIZED AIR SUPPLY TO AN AIR CELL IN A VEHICLE SEAT

(71) Applicant: Kongsberg Automotive AB, Mullsjö (SE)

(72) Inventors: Frank Dankbaar, Mullsjö (SE); Anders Grönhage, Mullsjö (SE)

(73) Assignee: Kongsberg Automobile AB, Mullsjö (SE)

( * ) Notice: Subject to any disclaimer, the term of this patent is extended or adjusted under 35 U.S.C. 154(b) by 0 days.

(21) Appl. No.: 15/104,033

(22) PCT Filed: Dec. 13, 2013

(86) PCT No.: PCT/EP2013/076494
§ 371 (c)(1),
(2) Date: Jun. 13, 2016

(87) PCT Pub. No.: WO2015/086088
PCT Pub. Date: Jun. 18, 2015

(65) Prior Publication Data
US 2017/0015222 A1    Jan. 19, 2017

(51) Int. Cl.
*F16K 31/00* (2006.01)
*B60N 2/90* (2018.01)

(52) U.S. Cl.
CPC ............. *B60N 2/914* (2018.02); *B60N 2/976* (2018.02); *F16K 31/002* (2013.01)

(58) Field of Classification Search
CPC ...... F16K 31/002; B06N 2/4415; B06N 5/448
(Continued)

(56) References Cited

U.S. PATENT DOCUMENTS

| 2,299,404 A | 10/1942 | Newton |
| 3,480,040 A | 11/1969 | Erickson |

(Continued)

FOREIGN PATENT DOCUMENTS

| CN | 101725733 A | 6/2010 |
| DE | 102 57 549 B3 | 8/2004 |

(Continued)

OTHER PUBLICATIONS

English language abstract and machine-assisted translation of Japanese Publication No. JP H07 71628 A extracted from www.espacenet.com on Aug. 15, 2017; 7 pages.

(Continued)

*Primary Examiner* — Umashankar Venkatesan
(74) *Attorney, Agent, or Firm* — Howard & Howard Attorneys PLLC (57) ABSTRACT

The present invention provides a SMA valve for controlling pressurized air supply to an air cell in a vehicle seat comprising: a valve housing, a valve element (4) which is moveably suspended in the housing to be moveable between a closed position and an open position, a spring element adapted to exert a bias force on the valve element urging it to the closed position, and a SMA wire (1) extending between a part fixed in the housing and the valve element and arranged such that shortening of the SMA wire upon exceeding its threshold temperature exerts a force on the valve element which pulls the valve element away from the closed position against the bias force of the spring element, characterized in that the valve element (4) is suspended by a connecting link (10, 10') connected with one of its ends to the valve element (4) and with its opposite end to a stationary component (8) in the housing by a hinge (12, 12') enabling pivotal movement of the connecting link (10, 10') between a first and second position of the connecting link (Continued)

corresponding to the closed and open position of the valve element (4), respectively.

20 Claims, 5 Drawing Sheets

(58) Field of Classification Search
USPC .............................................. 251/129.06, 11
See application file for complete search history.

(56) References Cited

U.S. PATENT DOCUMENTS

| | | | |
|---|---|---|---|
| 4,429,552 | A | 2/1984 | Reedy |
| 4,570,851 | A | 2/1986 | Cirillo |
| 4,655,505 | A | 4/1987 | Kashiwamura et al. |
| 4,840,425 | A | 6/1989 | Noble |
| 4,973,024 | A | 11/1990 | Homma |
| 5,127,708 | A | 7/1992 | Kishi et al. |
| 5,135,282 | A | 8/1992 | Pappers |
| 5,345,963 | A | 9/1994 | Dietiker |
| 5,622,482 | A | 4/1997 | Lee |
| 5,669,416 | A | 9/1997 | Nusche |
| 5,787,947 | A | 8/1998 | Hertsgaard |
| 6,024,545 | A | 2/2000 | Morioka |
| 6,116,569 | A * | 9/2000 | Cox ................. F16K 31/002 251/11 |
| 6,123,320 | A | 9/2000 | Rasanow et al. |
| 6,220,667 | B1 | 4/2001 | Wagener |
| 6,276,385 | B1 | 8/2001 | Gassman |
| 6,449,434 | B1 | 9/2002 | Fuss |
| 6,464,200 | B1 | 10/2002 | Hines et al. |
| 6,494,225 | B1 | 12/2002 | Olewicz et al. |
| 6,564,824 | B2 | 5/2003 | Lowery et al. |
| 6,918,884 | B2 * | 7/2005 | Knelsen ................. A47C 7/462 297/284.4 |
| 6,972,659 | B2 | 12/2005 | Von Behrens et al. |
| 7,093,817 | B2 | 8/2006 | MacGregor et al. |
| 7,331,563 | B2 | 2/2008 | Biehl et al. |
| 7,363,942 | B2 | 4/2008 | Fernandez |
| 7,484,528 | B2 * | 2/2009 | Beyerlein ............. F16K 31/002 137/596 |
| 7,663,811 | B2 | 2/2010 | Noda et al. |
| 7,748,405 | B2 | 7/2010 | Ghorbal et al. |
| 7,911,332 | B2 | 3/2011 | Caretta et al. |
| 8,127,543 | B2 | 3/2012 | Von Behrens et al. |
| 8,382,460 | B2 | 2/2013 | Ramunas et al. |
| 8,570,384 | B2 | 10/2013 | Brown et al. |
| 8,714,199 | B2 | 5/2014 | Deperraz et al. |
| 9,027,903 | B2 | 5/2015 | Arekar et al. |
| 9,462,928 | B2 | 10/2016 | Marone et al. |
| 9,630,560 | B2 | 4/2017 | Alacqua et al. |
| 2001/0011414 | A1 | 8/2001 | Hines et al. |
| 2005/0121636 | A1 | 6/2005 | Scott |
| 2007/0023089 | A1 | 2/2007 | Beyerlein et al. |
| 2007/0166170 | A1 | 7/2007 | Nason et al. |
| 2007/0246285 | A1 | 10/2007 | Browne et al. |
| 2008/0018198 | A1 | 1/2008 | Sohn et al. |
| 2008/0251746 | A1 * | 10/2008 | Riley ..................... F01L 1/185 251/129.04 |
| 2008/0254346 | A1 | 10/2008 | Burstall |
| 2008/0271559 | A1 | 11/2008 | Garscha |
| 2010/0111733 | A1 | 5/2010 | Ramunas et al. |
| 2010/0222733 | A1 | 9/2010 | Scheiber et al. |
| 2010/0332035 | A1 | 12/2010 | Gao et al. |
| 2011/0039967 | A1 | 2/2011 | Wilson et al. |
| 2011/0166524 | A1 | 7/2011 | Preuthun et al. |
| 2012/0011843 | A1 | 1/2012 | Makinson et al. |
| 2012/0002113 | A1 | 2/2012 | Stadelbauer et al. |
| 2012/0067430 | A1 | 3/2012 | Deperraz et al. |
| 2012/0153043 | A1 | 6/2012 | Arekar et al. |
| 2012/0160334 | A1 | 6/2012 | Deperraz et al. |
| 2012/0199768 | A1 | 8/2012 | Love et al. |
| 2012/0223554 | A1 | 9/2012 | Lem et al. |
| 2013/0002933 | A1 | 1/2013 | Topliss |
| 2013/0162896 | A1 | 6/2013 | Kang et al. |
| 2013/0277580 | A1 | 10/2013 | Deperraz |
| 2014/0060858 | A1 | 3/2014 | Johnson |
| 2014/0125042 | A1 | 5/2014 | Köpfer |
| 2015/0202993 | A1 | 7/2015 | Mankame et al. |
| 2016/0018016 | A1 | 1/2016 | Dankbaar et al. |

FOREIGN PATENT DOCUMENTS

| | | |
|---|---|---|
| DE | 10 2005 060217 A1 | 7/2006 |
| DE | 10 2008 021 444 A1 | 11/2009 |
| EP | 2 078 891 A2 | 7/2009 |
| EP | 2 239 486 A1 | 10/2011 |
| EP | 2 312 187 B1 | 11/2012 |
| JP | S62 167981 U | 10/1987 |
| JP | H07 71628 A | 3/1995 |
| JP | 2006-037786 A | 2/2006 |
| WO | WO 01/33306 A2 | 5/2001 |
| WO | WO 2007/030417 A2 | 3/2007 |
| WO | WO 2015/086089 A1 | 6/2015 |
| WO | WO 2015/086094 A1 | 6/2015 |
| WO | WO 2015/185132 A1 | 12/2015 |

OTHER PUBLICATIONS

English language abstract and machine-assisted English language translation of Japanese Publication No. JP 2006-037786 A extracted from www.espacenet.com on Aug. 15, 2017; 8 pages.
English language abstract and machine-assisted translation of Chinese Publication No. CN 101725733 A extracted from www.espacenet.com on Aug. 15, 2017; 5 pages.
English language abstract and machine-assisted English language translation of European Patent No. EP 2 312 187 A1 extracted from www.espacenet.com on Dec. 21, 2015; 7 pages.
International Search Report for International Patent Application No. PCT/IB2013/000307 dated Nov. 11, 2013; 4 pages.
Shkolnikov, Viktor, Ramunas, John, and Santiago, Juan G., "A Self-priming, roller-free, miniature, peristaltic pump operable with a single, reciprocating actuator", Sens Actuators A Phys. May 2010 ; 160(1-2): 141-146. doi:10.1016/j.sna.2010.04.018, © 2010 Elsevier B.V.; 16 pages.
Website: http://www.takasago-fluidics.com/products_valve/others/SMV/, Shape Memory Alloy Valve SMV Series, Jul. 9, 2014; 2 pages.
English language abstract and machine-assisted English language translation of DE 10 2005 060217 A1 extracted from www.espacenet.com on Jun. 8, 2016; 8 pages.
Partial English language translation of JP S62 167981 U extracted from www.j-platpat.inpit.go.jp on Nov. 3, 2016; 2 pages.
International Search Report for International Application No. PCT/EP2013/076494 dated Sep. 16, 2014; 2 pages.
International Search Report for Application No. PCT/EP2013/076507 dated Sep. 16, 2014, 4 pages.
International Search Report for Application No. PCT/EP2013/076593 dated Oct. 2, 2014, 3 pages.
International Search Report for Application No. PCT/EP2014/061614 dated Jan. 30, 2015, 4 pages.
English language abstract and computer-generated English translation for DE 102 57 549 B3 extracted from espacenet.com database on Nov. 15, 2016, 15 pages.
English language abstract and computer-generated English translation for DE 10 2008 021 444 A1 extracted from espacenet.com database on Nov. 15, 2016, 11 pages.
English language translation of JP S62 167981 U provided on Oct. 26, 2017, and certified by Morningside IP on Dec. 11, 2017, which was previously cited in a first Information Disclosure Statement on Nov. 4, 2016; 8 pages.

* cited by examiner

SMA VALVE FOR CONTROLLING PRESSURIZED AIR SUPPLY TO AN AIR CELL IN A VEHICLE SEAT

RELATED APPLICATIONS

This application is the National Stage of International Patent Application No. PCT/EP2013/076494, filed Dec. 13, 2013, the entire contents of which are hereby incorporated by reference.

The present invention relates to a SMA valve for controlling pressurized air supply to an air cell in a vehicle seat comprising: a valve housing, a valve element which is moveably suspended in the housing to be moveable between a closed position in which the valve element is in sealing abutment with a valve seat which establishes a closed state of the valve, and an open position in which the valve element is moved away from the valve seat corresponding to an open state of the valve, a spring element adapted to exert a bias force on the valve element urging it to the closed position, and a SMA wire extending between a part fixed in the housing and the valve element and arranged such that shortening of the SMA wire upon exceeding its threshold temperature exerts a force on the valve element which pulls the valve element away from the closed position against the bias force of the spring element.

Drivers and passengers of motor vehicles, especially when driving long distances, often experience discomforts caused by long time static posture when seated in the vehicle seat. This is not only felt as being uncomfortable and causing for example back pain but may also lead to permanent impairment of health, in particular for professional drivers such as taxi, truck and bus drivers. To provide a remedy the automotive industries since some time offers vehicle seats with adjustable lumbar supports and bolsters and with integrated massage systems in the back seat which are based on pneumatic actuation. The lumbar supports and bolsters in seats are adjusted by inflating air cells by supplying pressurized air to the air cells. Pressurized air supply is stopped and the air cells are closed once the lumbar support and bolsters reached their desired inflation state. In massage systems series of air cells in the seat back are sequentially inflated and deflated to provide a massage effect.

Such a massage system for a vehicle seat is for example disclosed in U.S. Pat. No. 5,135,282 A. A series of air cells is disposed along a common supply line, the common supply line being supplied with pressurized air from a pump. In order to produce a propagating sequential inflation along that series of air cells starting from the first cell at the lower end of the seat back and continuing cell by cell to the last cell at the upper end of the seat, a number of controllable valves and a control unit are provided. In principle there is a controllable valve upstream of each air cell to permit to control the inflation, deflation of each cell individually, and further valves for controlling venting. Since the number of air cells in a massage system is considerable, the number of valves is correspondingly large. Similarly, in vehicle seats having adjustable lumbar supports and bolsters valves are present to open the air cells for inflation and to close the cells at the desired inflated state.

Solenoid valves are technically well suited to be utilized as controllable valves in massage system and in lumbar support and bolster systems for vehicle seats. Typically, solenoid valves of the normally closed type are employed in this field, wherein a plunger is urged by a spring so that a sealing surface of the plunger is pressed onto a valve seat to keep the valve in the closed state. By supplying electrical power to the solenoid the plunger is by electromagnetic action lifted off the valve seat against the bias force of the spring, and when the current supply stopped the plunger is immediately returned by the spring force to its sealing position. Whereas such solenoid valves are well suited in view of their technical operation and in view of the fact that their operation can be precisely controlled by suitable application of electrical power, such valves are relatively expensive, physically large and heavy and therefore not preferred for applications such as in vehicle seats where valves have to be employed in large numbers for example in massage systems of vehicle seats.

Another type of controllable valve is the so called SMA valve, wherein SMA stands for "shape memory alloy". A SMA valve comprises a housing, a plunger as valve element, a spring urging the plunger to a closed position in a valve seat, and an actuator capable of acting on the plunger such that the actuator upon activation exerts a force on the plunger which moves the plunger away from the valve seat to an open position and keeps it there as long as the activator remains activated. In this case the actuator comprises a metal wire made of a shape memory alloy, which SMA wire is connected to the plunger and to a part fixed in the housing. Such shape memory alloy changes its microscopic structure at a threshold temperature such that a SMA wire shortens upon exceeding the threshold temperature. In particular, a SMA material at room temperature is in the state of a metal with martensitic properties, whereas the structure transitions at a threshold temperature of about 80° C. into an austenitic structure. Due to this transition a SMA wire shortens, wherein the shortening provides the force acting on the plunger to move it into the opened position. Actuation of the SMA valve is controlled by selectively supplying electrical power to the SMA wire to heat it up to the threshold temperature and to keep it at such temperature for the desired activation cycle, whereafter electrical power supply to the SMA wire is terminated to let the SMA wire cool down below the threshold temperature.

SMA valves have some advantages for applications such as in massage systems and lumbar supports and bolsters in vehicle seats since they can be designed to have low weight, the valves are almost completely quite in operation and may be provided at relatively low costs. On the other hand SMA wires contract at a relatively low rate of typically up to 4% of its length which is not sufficient for direct valve control. In order to use the length contraction to move a plunger of a SMA valve some kind of transmission is needed to translate the shortening of the wire into a longitudinal movement of a plunger, wherein such transmission may for example be realized by arranging the SMA wire to have an angle of attack a with respect to the direction of movement of the plunger. The transmission ratio (distance of plunger movement/shortening distance of the SMA wire) is proportional to $1/\cos(\alpha)$, so that with $\alpha$ being for example 75° a transmission ratio of about 3.9 is achieved.

A SMA valve is for example described in DE 10 2005 060 217 A1. This SMA valve comprises the features of the preamble of claim 1. This valve has a housing in which a plunger as a valve element is moveably suspended, wherein the plunger is axially guided in a mounting plate and extends further through openings in a shield wall. A SMA wire is fixed with its two opposite ends to the mounting plate at spaced apart points, and is in its central portion fixed to the plunger at a level elevated over the mounting plate such that the SMA wire has the shape of an isosceles triangle wherein the SMA wire portions extending from the central portion in opposite directions form the legs of equal length, and the mounting plate forms the opposite side of the triangle. When the SMA wire is heated up by supply of electrical power to above threshold temperature, the SMA wire shortens which results in shortening of the two legs of the triangle which in turn moves the apex where the SMA wire is connected to the plunger closer to the mounting plate, whereby the plunger is moved to the open state of the valve. The plunger is guided in throughholes for linear movement which has the disadvantage that frictional forces may be caused by the guiding holes. In addition, the extension of the SMA wire forming an isosceles triangle together with the mounting plate leads to relatively large lateral dimensions of the valve because the angle between the legs is in the embodiment shown rather large and preferably 145° so that the distance between the opposite end points of the wire where it is fixed to mounting plate is relatively large.

It is an object of the present invention to arrange a SMA valve in such a manner that the valve element is suspended in the housing to be moveable between the closed and open position with low friction. Furthermore, the suspension should allow for a compact design of the valve.

This object is achieved by a SMA valve comprising the features of claim 1. Preferred embodiments of the invention are set out in the depended claims.

According to the invention the valve element suspended by a connecting link connected with one of its ends to valve element and with its opposite end to a stationary component in the housing, wherein in the latter connection a hinge enables pivotal movement of the connecting link between a first and a second position of the connecting link corresponding to the closed and open position of the valve element, respectively. The connecting link is for example connected to a central portion of the valve element and extending for example essentially at a right angle with respect to the longitudinal direction of the valve element.

In this manner the valve element may move between the closed and open position enabled by the hinge at the connection of the connecting link to the stationary component, and may move in this manner without further guiding elements and thus without friction.

The stationary component may for example be an elongated mounting bar adapted to be connectable to a mounting plate which is to be fixed in the valve housing. The mounting plate can for example be a printed circuit board.

In this arrangement the valve element is with its longitudinal axis oriented parallel to the mounting plate, and its moving direction is essentially parallel to the mounting plate. This arrangement is preferred because it allows a very compact design of the valve since the valve element is not with its longitudinal direction extending perpendicular to the mounting plate and does not move in this direction as in the prior art but can be disposed close to the mounting plate and with its longitudinal extension parallel thereto such that the extension of the valve element in the direction perpendicular to the mounting plate can be reduced.

In a preferred embodiment the stationary component, the connecting link and the moveable valve element are integrally formed of plastic material, and the hinge is a solid state hinge having a zone of weakened material thickness.

In a preferred embodiment the connecting link is connected to the valve element also by a hinge enabling the valve element to keep its longitudinal axis in the same orientation in space during the pivotal movement of the connecting link between the first and second position and vice versa.

In this case the stationary component, the connecting link and the moveable valve element may be integrally formed of plastic material, and both the hinge and the valve element hinge are solid state hinges, each having a zone of weakened material thickness. In such arrangement the valve element and its suspension with a stationary component may be formed in a very cost effective manner as a one piece building component to be mounted in the valve housing.

In a preferred embodiment the connecting link is extending with respect to the valve element such that it is oriented perpendicular to the movement direction of the valve element at least once during the movement of the valve element between the first and second position and vice versa. This arrangement implies that the movement of the valve element is rectilinear in good approximation since the connecting link (if longitudinal and movement direction of the valve element are vertical) moves over an angular range around its horizontal orientation in which it is perpendicular to the direction of movement and to the longitudinal axis of the valve element such that the movement of the valve element is to a good approximation a rectilinear vertical movement. For example, the connecting links may have a length of 9 mm, the distance of travel of the valve element from the closed to the open position may be 1 mm. If the connecting links are perpendicular to the valve element in the closed position thereof, they pivot over a range of about 6° during the movement of the valve element 1 mm backwards to the open position. The deviation of the movement of the valve element from a rectilinear movement in this example is less than 0.05 mm (displacement perpendicular to the longitudinal direction and main moving direction component of the valve element) which is small compared to the travel distance of 1 mm and may be neglected to a good approximation. This main moving direction is referred to as the moving direction of the valve element herein.

In a preferred embodiment there are two such connecting links, the first connecting link extending between a first portion of the valve element and a first hinge on the stationary component, and the second connecting link extending between a second portion spaced apart from the first portion of the valve element in moving direction thereof and a second hinge on the stationary component, the first and second hinges being likewise spaced apart in moving direction of the valve element when moving between its closed and open positions and vice versa so that a parallelogram suspension of the valve element on the stationary component is formed. In this manner a particularly stable suspension of the valve element, and a suspension essentially free of friction are achieved.

In a preferred embodiment the first connecting link and the second connecting link extend parallel to each other.

Also in the embodiment with a parallelogram suspension of the valve element all components may be integrally formed such that the stationary component, the first connecting link, the second connecting link, and the moveable valve element are integrally formed of plastic material, wherein the first and second hinges as well as the valve element hinges connecting the first and second connecting links to the valve element are solid state hinges, each solid hinge having a zone of weakened material thickness. Thus, also the parallelogram suspension of the valve element may be manufactured in a cost effective manner, for example by injection moulding resulting in an integrally formed member comprising the moveable valve element, its suspension on a stationary component to be mounted in the valve housing.

In a preferred embodiment the SMA wire is guided in such a manner that it extends from the valve element in a first rectilinear portion at an angle with respect to the longitudinal direction of the valve element that is smaller than 90° to a deflection means, and from the deflection means in a second portion at an angle with respect to the longitudinal direction of the valve element that is smaller than 45°, preferably in a direction parallel to the longitudinal direction of the valve element. The first portion of the SMA wire extending at an acute angle smaller than 90° is needed to generate a force component in the longitudinal direction of the valve element to cause its movement from the closed to the open position. The SMA wire is then preferably deflected to a smaller angle to the longitudinal direction of the valve element, preferably to parallel direction, so that the overall lateral dimension of the arrangement in direction perpendicular to the longitudinal direction and movement direction of the valve element is kept small.

A further advantage of this arrangement is that the transmission ratio of the shortening movement of the SMA wire to the valve element movement is increasing during the valve element movement from its closed to the open position. This transmission ratio depends on the angle between the SMA wire and the direction of movement of the valve element, the transmission ratio being proportional to 1/cos ($\alpha$), where $\alpha$ is the angle between the SMA wire pulling on the valve element and the direction of movement of the valve element. If the SMA wire extends only through a first portion at an angle less than 90°, it is only this first portion which pivots around the deflection point when the plunger moves from its closed to the open position. Therefore, the angle $\alpha$ between the SMA wire changes over a larger range as compared to the case without deflection since the turning point around which the first portion of the SMA wire pivots is now the point of the deflection means, and not the point where the end of the SMA wire is fixed with respect to a stationary component. Practically this means for example that the SMA wire is oriented at 74° in the closed position, wherein a movement of 1 mm backward to the open position already corresponds to a angle $\alpha$ of 80°. Taking into account that the transmission ratio is proportional to 1/cos($\alpha$) this leads to a significant change in the transmission ratio at the end of the movement of the valve element from the closed to the open position. This increasing transmission ratio at the end of the movement of the valve element to the open position is advantageous since the shortening rate of the SMA wire decreases rapidly at the end of the transition process. With the increasing transmission ratio this decreasing shortening rate of the SMA wire is compensated so that a more uniform movement of the valve element from the closed to the open position is achieved.

The deflection means may preferably be provided by a protrusion on the stationary component around which the SMA wire is routed.

In a preferred embodiment the SMA wire is guided such that it extends from a first fixation point where it is fixed with respect to the stationary component along said a second portion to the deflection means, along said first portion to the valve element where it is guided in a groove around the valve element to its opposite side where the SMA wire is extending in a symmetrical manner along an opposite first portion to an opposite deflection means and from there along an opposite second portion to an opposite fixation point with respect to the stationary component. The fixation of the SMA wire with respect to the stationary component can also be achieved in a manner that the end of the SMA wire is fixed to a mounting plate to which the stationary component is connected.

In this manner a compact arrangement of valve element, suspension and the actuating SMA wire together with the stationary component as one compact building block is obtained.

The invention will in the following be described in more detail in connection with preferred embodiments in the drawings in which.

Figure 1:
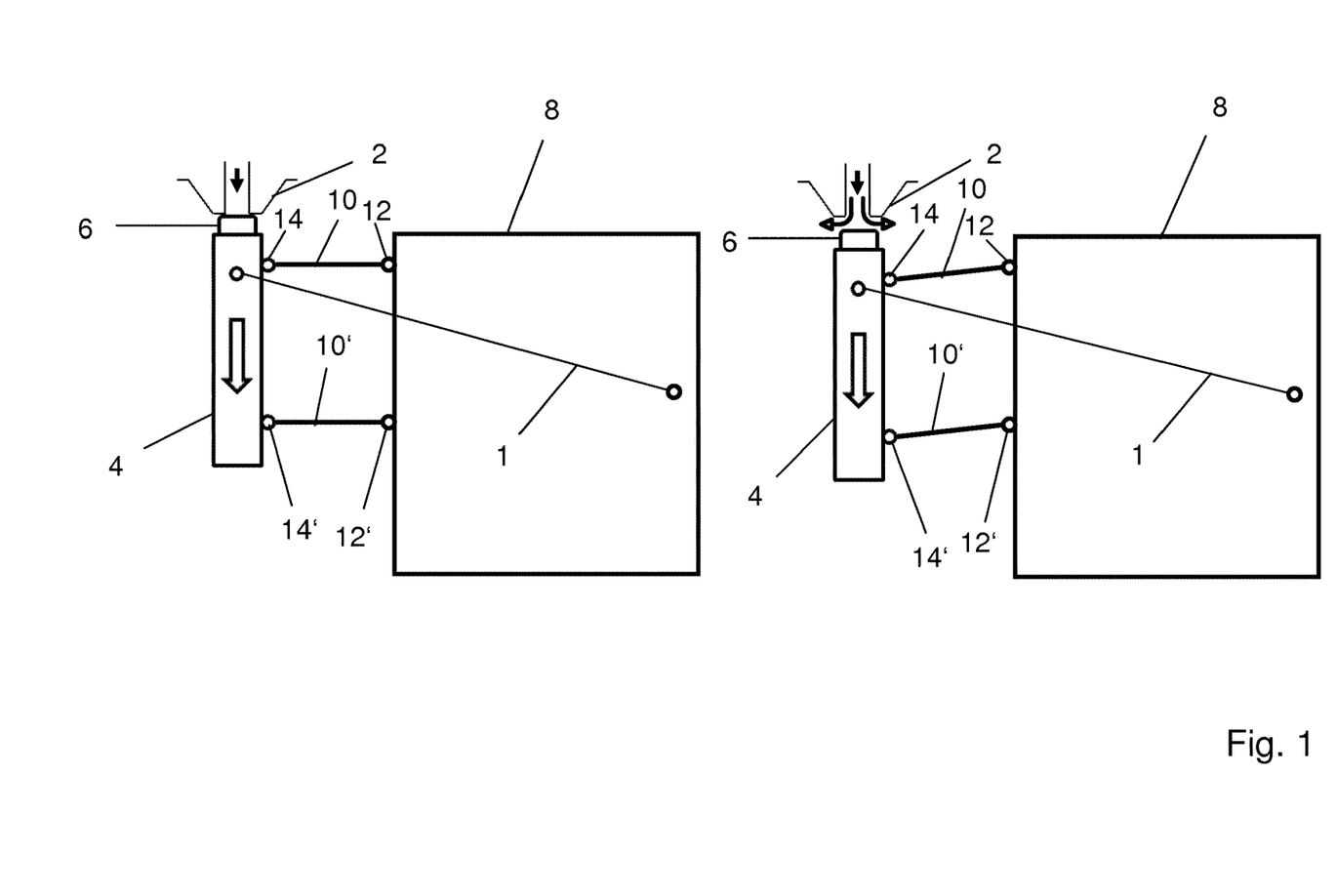
FIG. 1 shows schematic views of the valve element suspension to illustrate its transition from the closed to the open position.

FIG. 1 shows schematical views of a valve element suspension. A SMA valve comprises a housing (not shown) in which a pressure chamber is located. The housing comprises a valve port 2 which is supplied with pressurized air. On the left hand side the valve element 4 is shown with its sealing tip 6 in engagement with a valve seat formed on the inner end of the valve port 2 so that the valve is closed.

On the right hand side the valve element 4 is shown in its retracted position in which the sealing tip 6 has been lifted off the valve seat on valve port 2 so that the valve is in its open state and pressurized air can enter through the valve port 2 into the pressure chamber of the valve. From there the pressurized air flows to an output port (not shown) of the valve.

The valve element 4 in the form of a plunger is suspended on a stationary component 8 which is mounted in the housing of the valve. Two parallel connecting links 10, 10' are connecting the valve element 4 to the stationary component 8. The connections of the connecting links 10, 10' to the stationary component 8 are provided with hinges 12, 12'. Also the connections of the connecting links 10, 10' to the valve element 4 are provided with hinges 14, 14'.

As can be seen in FIG. 1 the connecting links 10, 10' provide a parallelogram suspension for the valve element 4. In the closed position of the valve element 4 on the left hand side the connecting links 10, 10' extend perpendicular to the longitudinal axis and to the direction of movement of the valve element 4. Since the connecting links 10, 10' pivot only over a small angular range from the closed position shown on the left hand side to the open position shown on the right hand side of FIG. 1, the movement of the valve element 4 is to a good approximation linear since the connecting links 10, 10' are still close to the perpendicular orientation to the longitudinal axis of the valve element 4 in the open position of the valve element. Therefore, the valve element movement is to a good approximation a linear, vertical downwardly directed movement.

This movement is caused when the SMA wire 1 shortens upon exceeding its threshold temperature when it has been supplied with activating electrical power. This downward movement is effected because the SMA wire is arranged to extend to the valve element 4 under an angle of less than 90° to the vertical direction so that a pulling force along the SMA wire is also accompanied by a downwardly directed force component on the valve element 4.

Figure 2:
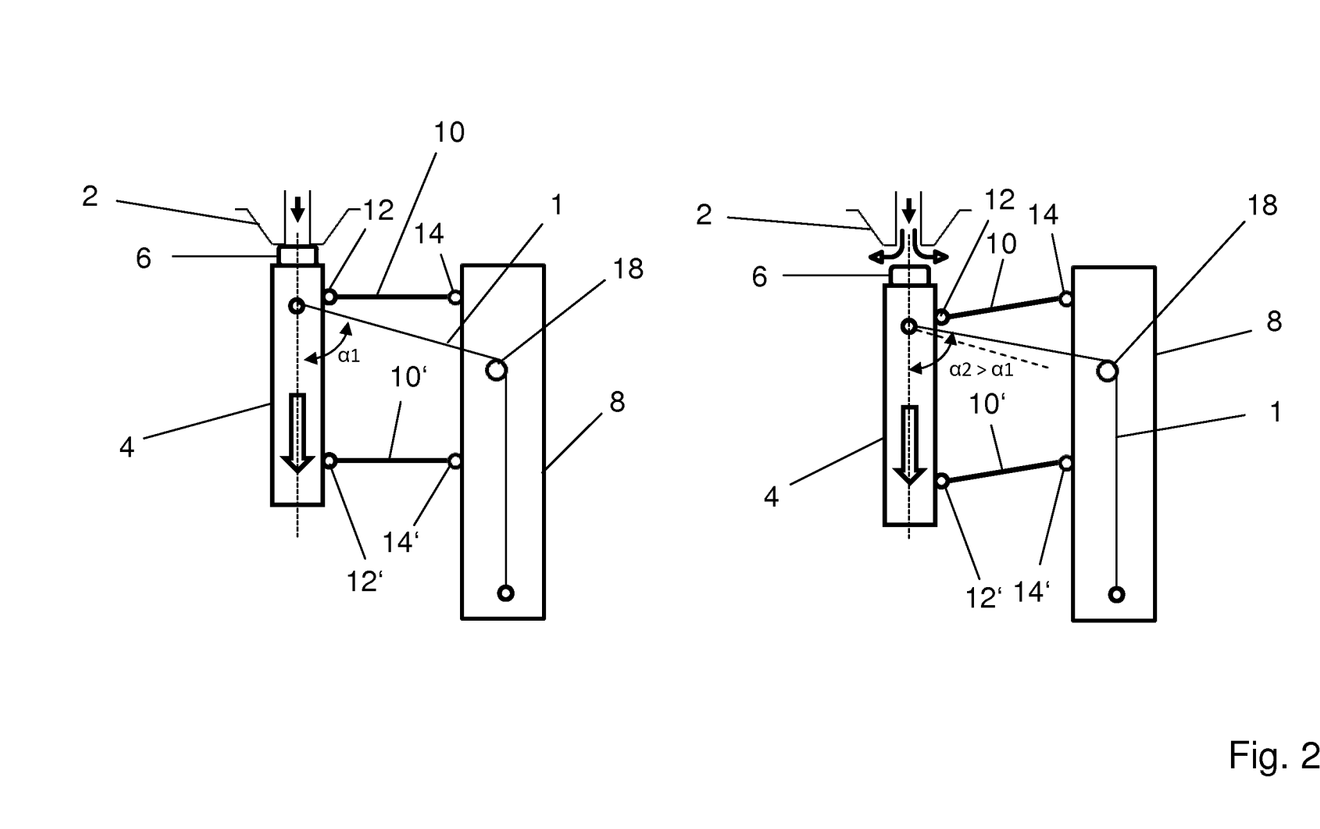
FIG. 2 shows schematic views corresponding to FIG. 1 but featuring a preferred arrangement of the SMA wire.

FIG. 2 shows similar schematical views as in FIG. 1 except that the SMA wire is arranged to extend in a different manner. With one of its ends the SMA wire 1 engages the valve element 4. From the valve element 4 the SMA wire is arranged to extend in a first linear portion at an angle α1 smaller than 90° to the longitudinal direction of the valve element 4. This first linear portion of the SMA wire 1 extends to a deflection means 18 where the SMA wire 1 is guided around deflection means 18 to change its direction in a second portion of the SMA wire to a direction which is parallel to the longitudinal direction of the valve element 4 and the direction of its movement. This arrangement is advantageous since it allows to reduce the lateral dimension of the arrangement as compared to FIG. 1. From a comparison of FIGS. 1 and 2 the above-described advantage of a deflection of the SMA wire at deflection means 18 can be seen, namely that the angle of attack in which the first portion of the SMA wire extends with respect to the longitudinal direction of the valve element is changing in the embodiment of FIG. 1 only by a small amount, whereas the angular range over which the angle of attack varies during movement of the valve element from the closed to the open position from α1 to α2 is lager in the embodiment of FIG. 2. As mentioned above this larger range over which the angle of attack α changes is advantageous since the transmission ratio (shortening distance of the SMA wire/movement distance of the valve element) is proportional to $1/\cos(\alpha)$. Since the shortening rate of the SMA wire decreases at the end of the transition phase it is preferred to have an increased transmission ratio in this phase in order to counter-act the non-linearity of the shortening process of the SMA wire and to thereby achieve a movement of the valve element with a more uniform velocity.

The parallelogram suspension on the one hand ensures a stable suspension, and on the other hand enables an essentially friction free movement of the valve body from the closed to the opened position.

Figure 3:
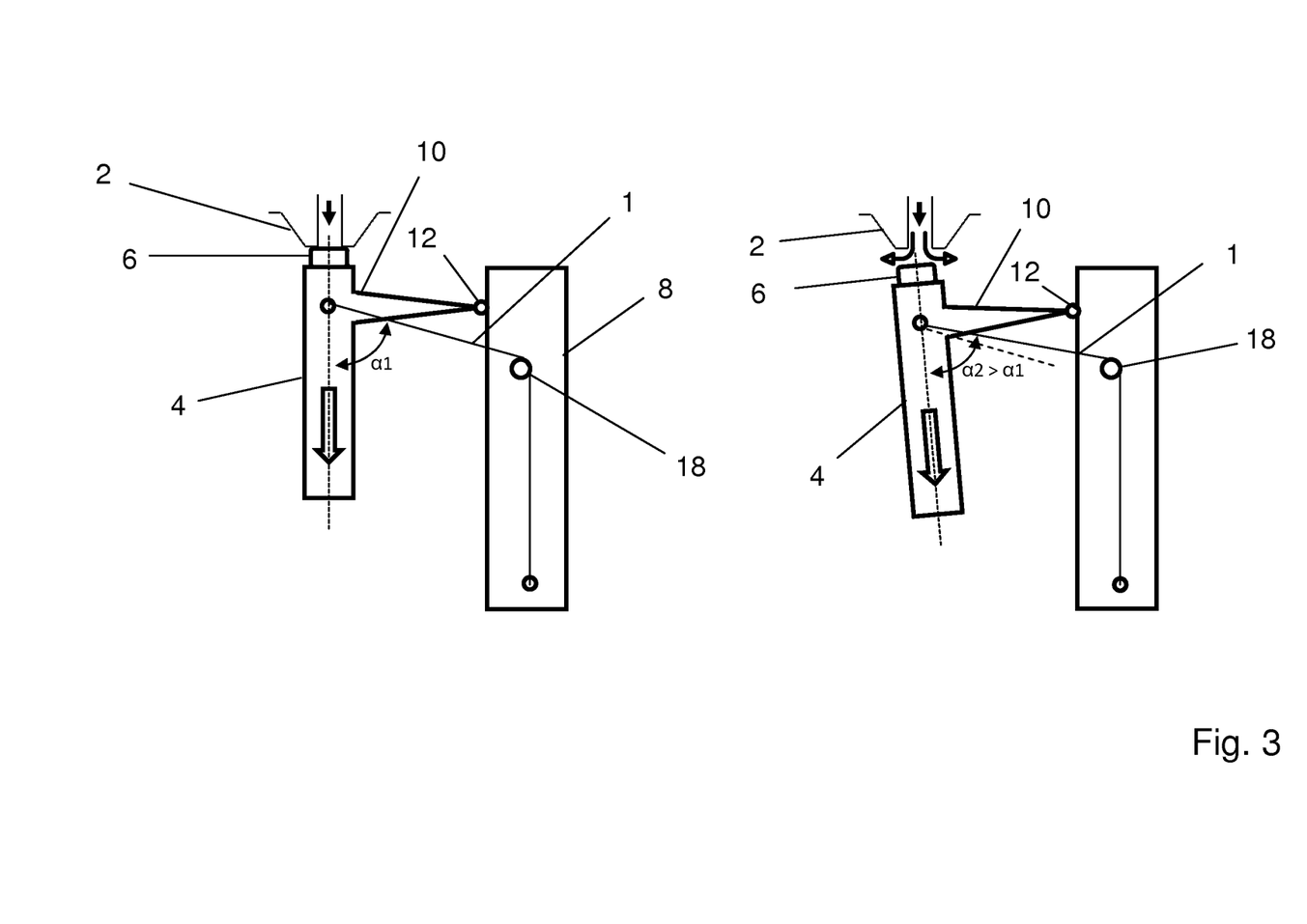
FIG. 3 shows schematic views of an alternative embodiment for a valve element suspension.

FIG. 3 shows a schematic view of a simplified embodiment of the valve element suspension. In this case only one connecting link 10 is present which is connected by a hinge 12 to the stationary component 8. At the opposite end the connecting link is directly connected to valve element 4 (without hinge). Since in this connection to the valve element 4 no hinge is present the pivotal movement of the connecting link 10 is accompanied by a pivotal movement of the valve element 4 such that its longitudinal direction slightly changes with respect to the vertical direction in the view of FIG. 3.

Figure 4:
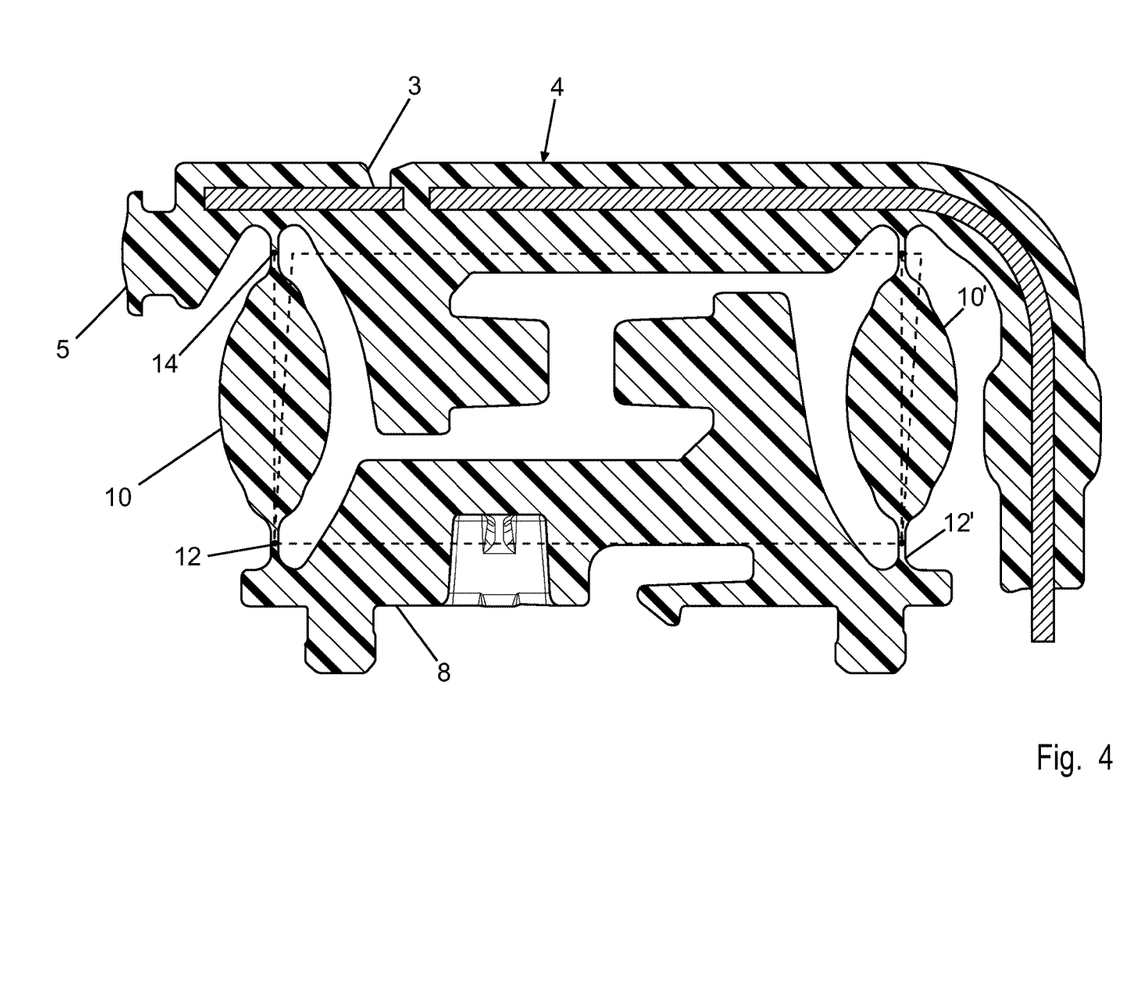
FIG. 4 shows a top view of an embodiment in which connecting links, hinges and valve body are integrally formed in one piece.
Figure 5:
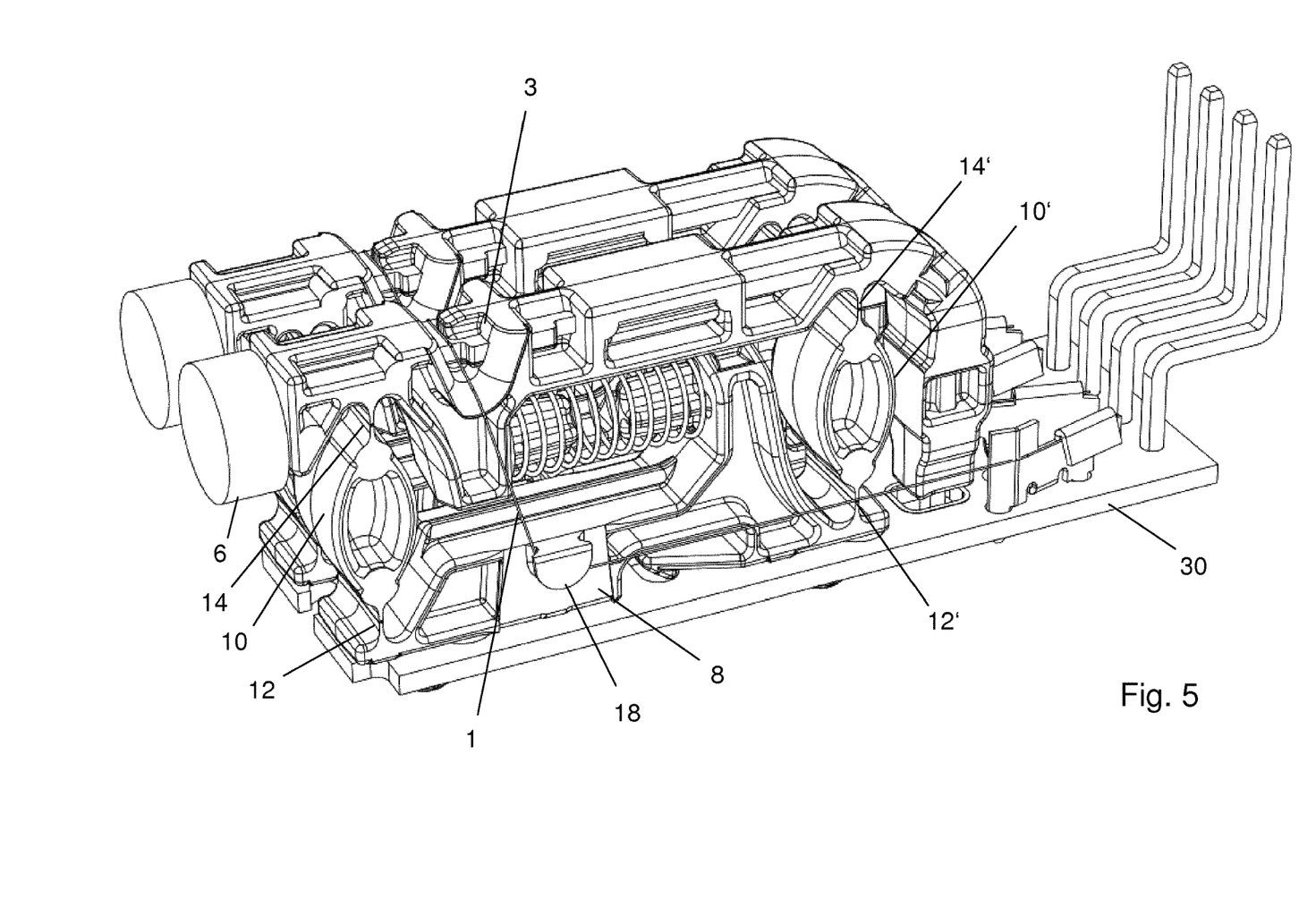
FIG. 5 shows a perspective view of an arrangement in which a component as shown in FIG. 3 in a twin-arrangement on a printed circuit board.

In FIGS. 4 and 5 a preferred embodiment of the parallelogram suspension of the valve element is shown. In this embodiment an integrally formed actuator element is realized which includes stationary component to be connected to a mounting plate, interconnecting links, hinges and valve body in one integrally formed member. This member can for example be formed by injection moulding, wherein the design of the valve element suspension is completely play fee and can achieve very small tolerances.

The lower portion of the component shown in FIG. 4 is the stationary component 8 in the form of an elongated mounting bar from which studs extend vertically downwardly which serve to engage with mounting holes for fixing the stationary component 8 on the mounting plate, for example a printed circuit board which is to be mounted in the housing of the valve. This stationary component 8 is connected by the two interconnecting links 10, 10' to the valve element 4. The valve element 4 has a projection 5 with a flange which serves for mounting of the sealing tip 6. The valve element 4 further has a groove 3 which will be explained later on in connection with FIG. 5.

The connecting links 10, 10' are connected to the stationary component 8 by hinges 12, 12' which are formed as flexure hinges or solid state hinges, each with a zone of weakened material thickness. Likewise, the valve element hinges 14, 14' are provided as solid state hinges, each having a zone of reduced material thickness. The dashed lines indicate the positioning of the parallelogram suspension in the closed and opened state of the valve element.

In the middle between the valve element 4 and the stationary component 8 there are two opposing cylindrical projections, one extending from the valve element 4 and one extending from the stationary component. These projections serve as mounting means in order to mount a helical spring with its opposite ends over the two projections such that the spring acts between the stationary component 8 and the valve element 4 to bias the valve element to its closed position.

In FIG. 5 a perspective view of the integrated actuator component in a twin arrangement is shown. Here a spring 22 is shown mounted on the projections of the stationary component 8 and of the valve element 4. Furthermore the arrangement of the SMA wire on the actuator is illustrated. The SMA wire 1 is fixed with one of its ends at an element fixed to the mounting plate 30 which is a printed circuit board. From there SMA wire 8 extends rectilinear, parallel to the longitudinal direction of the valve element 4 to a deflection means 18 formed on a side surface of the stationary component. This deflection means is a protrusion with a groove in which the SMA wire 1 is guided and deflected. From the deflection means 18 the deflected SMA wire 8 extends in a linear portion to the groove 5. In this groove 5 the SMA wire 1 is guided around the valve element 4 to its opposite side where an exactly symmetrical extension continues, i.e. an opposite first portion to an opposite deflection point, an opposite second linear portion, parallel to the longitudinal axis of the valve element to an opposite fixing element mounted at the end of the printed circuit board.

In this manner a very compact actuator is realized. The SMA wire 1 has two end portions, originating from the groove 5 in the valve element 4 which extend on the same side of the valve element 4, i.e. there is no triangle formed by the extension of the SMA wire, but the second leg or end portion of the SMA wire is extending in a symmetrical manner on the same side of the valve element 4 which allows for reduced lateral dimensions of the SMA valve. In addition, the valve design is rather compact as far as its extension perpendicular to the mounting plate is concerned since the valve element is with its longitudinal direction extending parallel to the mounting plate, and is moving in this direction, for which reason less space in the direction perpendicular to the mounting plate is needed in comparison to arrangements in which the valve element is extending perpendicular to the mounting plate. Furthermore, the actuator is easy to manufacture and can be assembled in a manufacturing process with very few steps since many elements (valve element, stationary component, connecting links, hinges) are already formed integrally in one piece. In addition, a play free operation of the actuator is guaranteed, and finally a friction free movement of the valve element.

The invention claimed is:

1. An SMA valve for controlling pressurized air supply to an air cell in a vehicle seat comprising:
    a valve housing,
    a valve element which is moveably suspended in the housing to be moveable between a closed position in which the valve element is in sealing abutment with a valve seat which establishes a closed state of the valve, and an open position in which the valve element is moved away from the valve seat corresponding to an open state of the valve, a spring element adapted to exert a bias force on the valve element urging it to the closed position, and an SMA wire extending between a part fixed in the housing and the valve element and arranged such that shortening of the SMA wire upon exceeding a threshold temperature exerts a force on the valve element which pulls the valve element away from the closed position against the bias force of the spring element, wherein the valve element is suspended by a connecting link having ends with the connecting linking connected with one of the ends to the valve element and with the opposite end to a stationary component in the housing by a hinge enabling pivotal movement of the connecting link between a first position and a second position of the connecting link corresponding to the closed and open positions of the valve element, respectively; and wherein the stationary component and the connecting link are integrally formed and the hinge is a solid state hinge with a zone of weakened material thickness.

2. The SMA valve according to claim 1, wherein the stationary component, the connecting link and the moveable valve element are integrally formed of plastic material.

3. The SMA valve according to claim 2, the connecting link is connected to the valve element by a valve element hinge enabling the valve element to keep a longitudinal axis in the same orientation in space during the pivotal movement of the connecting link between the first and second positions.

4. The SMA valve according to claim 2, wherein the connecting link is extending with respect to the valve element such that it is oriented perpendicular to the movement direction of the valve element at least once during the movement of the valve element between the first and second positions.

5. The SMA valve according to claim 1, wherein the connecting link is connected to the valve element by a valve element hinge enabling the valve element to keep a longitudinal axis in the same orientation in space during the pivotal movement of the connecting link between the first and second positions.

6. The SMA valve according to claim 5, wherein the stationary component, the connecting link and the moveable valve element are integrally formed of plastic material and that both the hinge and the valve element hinge are solid state hinges, each having a zone of weakened material thickness.

7. The SMA valve according to claim 5, wherein the connecting link is further defined as a first connecting link extending between a first portion of the valve element and a first hinge on the stationary component, and a second connecting link extending between a second portion spaced apart from the first portion of the valve element in moving direction thereof and a second hinge on the stationary component, the first and second hinges being likewise spaced apart in moving direction of the valve element when moving between the first and second positions so that a parallelogram suspension of the valve element on the stationary component is formed.

8. The SMA valve according to claim 7, wherein the first connecting link and the second connecting link extend parallel to each other.

9. The SMA valve according to claim 8, wherein the stationary component, the first connecting link, the second connecting link, and the moveable valve element are integrally formed of plastic material and that the first and second hinges as well as the valve element hinges connecting the first and second connecting links to the valve element are solid state hinges each having a zone of weakened material thickness.

10. The SMA valve according to claim 7, wherein the stationary component, the first connecting link, the second connecting link, and the moveable valve element are integrally formed of plastic material and that the first and second hinges as well as the valve element hinges connecting the first and second connecting links to the valve element are solid state hinges each having a zone of weakened material thickness.

11. The SMA valve according to claim 1, wherein the connecting link is extending with respect to the valve element such that it is oriented perpendicular to the movement direction of the valve element at least once during the movement of the valve element between the first and second positions.

12. The SMA valve according to claim 1, wherein the SMA wire extends from the valve element in a first rectilinear portion to a deflection member at an angle with respect to the longitudinal direction of the valve element that is smaller than 90°, and from the deflection member in a second portion at an angle with respect to the longitudinal direction of the valve element that is smaller than 45°.

13. The SMA valve according to claim 12, wherein the deflection member are provided by a protrusion on the stationary component around which the SMA wire is routed.

14. The SMA valve according to claim 12, wherein the SMA wire extends in the second portion parallel to the longitudinal direction of the valve element.

15. The SMA valve according to claim 12, wherein the SMA wire extends from a first fixation point where it is fixed with respect to the stationary component along said second portion to the deflections member, along said first portion to the valve element where it is guided in a groove around the valve element to an opposite side where the SMA wire is extending in a symmetrical manner along an opposite first portion to an opposite deflection member and from there along an opposite second portion to an opposite fixation point fixed with respect to the stationary component.

16. An SMA valve for controlling pressurized air supply to an air cell in a vehicle seat comprising:

a valve housing, a valve element which is moveably suspended in the housing to be moveable between a closed position in which the valve element is in sealing abutment with a valve seat which establishes a closed state of the valve, and an open position in which the valve element is moved away from the valve seat corresponding to an open state of the valve, a spring element adapted to exert a bias force on the valve element urging it to the closed position, and an SMA wire extending between a part fixed in the housing and the valve element and arranged such that shortening of the SMA wire upon exceeding a threshold temperature exerts a force on the valve element which pulls the valve element away from the closed position against the bias force of the spring element, wherein the valve element is suspended by a connecting link having ends with the connecting linking connected with one of the ends to the valve element and with the opposite end to a stationary component in the housing by a hinge enabling pivotal movement of the connecting link between a first position and a second position of the connecting link corresponding to the closed and open positions of the valve element, respectively; and wherein the stationary component is formed by an elongated mounting bar which is adapted to be connectable to a mounting plate to be fixed in the valve housing, wherein the suspension is arranged such that the orientation of the valve element is such that a longitudinal direction of the valve element is essentially parallel to the mounting plate.

17. The SMA valve according to claim 16, wherein the stationary component, the connecting link and the moveable valve element are integrally formed of plastic material and that the hinge is a solid state hinge with a zone of weakened material thickness.

18. The SMA valve according to claim 16, wherein the connecting link is connected to the valve element by a valve element hinge enabling the valve element to keep a longitudinal axis in the same orientation in space during the pivotal movement of the connecting link between the first and second positions.

19. The SMA valve according to claim 16, wherein the connecting link is extending with respect to the valve element such that it is oriented perpendicular to the movement direction of the valve element at least once during the movement of the valve element between the first and second positions.

20. The SMA valve according to claim 16, wherein the SMA wire extends from the valve element in a first rectilinear portion to a deflection member at an angle with respect to the longitudinal direction of the valve element that is smaller than 90°, and from the deflection member in a second portion at an angle with respect to the longitudinal direction of the valve element that is smaller than 45°.

* * * * *

UNITED STATES PATENT AND TRADEMARK OFFICE
CERTIFICATE OF CORRECTION

PATENT NO. : 10,207,619 B2
APPLICATION NO. : 15/104033
DATED : February 19, 2019
INVENTOR(S) : Frank Dankbaar et al.

Page 1 of 1

It is certified that error appears in the above-identified patent and that said Letters Patent is hereby corrected as shown below:

In the Claims

Column 10, Claim number 13, Line number 28, please delete "are" and replace with:
-- is --.

Column 10, Claim number 15, Line number 36, please delete "deflections" and replace with:
-- deflection --.

Signed and Sealed this
Twenty-eighth Day of January, 2020

Andrei Iancu
*Director of the United States Patent and Trademark Office*